United States Patent
Perrone et al.

(10) Patent No.: US 7,506,038 B1
(45) Date of Patent: Mar. 17, 2009

(54) CONFIGURATION MANAGEMENT SYSTEM AND METHOD THEREOF

(75) Inventors: Antonio Perrone, Rome (IT); Bernardo Pastorelli, L'Aquila (IT); Brian Joseph Schlosser, Austin, TX (US); Paolo Salerno, Rome (IT); Rossella De Gaetano, Rome (IT); Tomasz Stopa, Krakow (PL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/129,651

(22) Filed: May 29, 2008

(51) Int. Cl.
*G06F 15/177* (2006.01)
*G06F 12/00* (2006.01)

(52) U.S. Cl. ..................... 709/220; 709/221

(58) Field of Classification Search ............... 709/220, 709/221, 250, 224, 203
See application file for complete search history.

(56) References Cited

U.S. PATENT DOCUMENTS

| | | | |
|---|---|---|---|
| 5,754,763 A | 5/1998 | Bereiter | |
| 5,872,979 A * | 2/1999 | Edel et al. | 717/170 |
| 7,020,697 B1 | 3/2006 | Goodman et al. | |
| 7,133,917 B2 | 11/2006 | Re et al. | |
| 7,139,737 B2 | 11/2006 | Takahashi et al. | |
| 2002/0049749 A1 | 4/2002 | Helgeson et al. | |
| 2004/0237042 A1 | 11/2004 | Murray et al. | |
| 2005/0120095 A1 | 6/2005 | Aman et al. | |
| 2005/0125509 A1 | 6/2005 | Ramachandran | |
| 2005/0177829 A1* | 8/2005 | Vishwanath | 717/177 |
| 2005/0188071 A1 | 8/2005 | Childress et al. | |
| 2006/0179058 A1 | 8/2006 | Bram et al. | |
| 2006/0229994 A1 | 10/2006 | Moulckers et al. | |
| 2006/0248309 A1* | 11/2006 | D'Alterio et al. | 711/206 |
| 2007/0006304 A1* | 1/2007 | Kramer et al. | 726/22 |

(Continued)

FOREIGN PATENT DOCUMENTS

EP      1 793 323 A2      6/2007

(Continued)

OTHER PUBLICATIONS

Keller, A., et al., "Dynamic Dependencies In Application Service Management" Proc. of the Int'l Conf. on Parallel-Distrib'd Proc'g Tech. and Appl.,IBM Yrkt'n Hts, NY; May 5, 2000.

(Continued)

*Primary Examiner*—Zarni Maung
(74) *Attorney, Agent, or Firm*—Thorne & Halajian, LLP

(57) ABSTRACT

A method for determining a software configuration in a computer system having a plurality of devices which can communicate with a central server and a one or more shared file systems, the method including the acts of determining, by each of the plurality of devices, which of the one or more shared file systems the corresponding device is mounted to; designating for each of the one or more shared file systems a device which is mounted thereto to perform a scanning operation on the corresponding shared file system, the device being selected from the plurality of devices; scanning, by each designated device, the one or more shared file systems that the corresponding device has been designated to scan so as to identify software products on the corresponding shared file systems that correspond with the catalog information; and receiving, from each designated device, results of the scanning for further processing.

1 Claim, 2 Drawing Sheets

U.S. PATENT DOCUMENTS

2007/0011485 A1* 1/2007 Oberlin et al. ............... 714/4
2007/0100892 A1  5/2007 Kephart et al.

FOREIGN PATENT DOCUMENTS

| JP | 2004-178121 | 6/2004 |
|---|---|---|
| WO | WO 01/42922 A1 | 6/2001 |
| WO | WO 2004/090672 A1 | 10/2004 |
| WO | WO 2005/121950 A2 | 12/2005 |
| WO | WO 2006/014504 A2 | 2/2006 |
| WO | WO 2007/016624 A2 | 2/2007 |
| WO | WO 2007/040858 A1 | 4/2007 |

OTHER PUBLICATIONS

Katachabaw, et al., "Making Distributed Applications Manageable Through Instrumentation" The Journal of Systems and Software; 1991; CS Dept., University of Western Ontario.

Nagios, Documentation Version 3.x Documentation; Mar. 20, 2007.

Balance, et al., "Supercomputing Center Management Using AIRS" Proceedings of the 2003 Linux Clusters Institute Conference, 2003; Albuquerque, New Mexico (2003).

* cited by examiner

CONFIGURATION MANAGEMENT SYSTEM AND METHOD THEREOF

FIELD OF THE INVENTION

The present invention relates a system and method for determining license compliance and, more particularly, to a configuration management system for obtaining information about software installed on monitored file systems, and a method of operation thereof.

BACKGROUND OF THE INVENTION

License compliance calculation, as well as configuration management, requires a thorough and accurate picture of software installed on each monitored machine (e.g., computer, server, etc.). Accordingly, configuration management systems, as well as license compliance systems, must scan each monitored machine to obtain a complete picture of software that is installed on the respective machine. However, in order to save disc space and ease product maintenance, software is commonly installed on one or more shared discs (forming a shared file system) that are accessible by multiple servers (machines). In order to obtain a thorough picture of installed software, a configuration management product that is installed on each of multiple servers in a system environment must execute an inventory scan of the shared file system and search for installed software. Because a shared file system can be typically mounted by hundreds or even thousands of server machines, this scan operation can be resource and network intensive and can strain valuable system and/or network resources. Accordingly, when many server machines access shared file systems to perform a software inventory scan, the file-sharing servers are inundated with work and their performance (i.e., shared discs) may be compromised, thus, rendering them unable to perform a real workload which is their primary function.

Accordingly, to assure that a file-sharing server is available for performing a real workload, a shared file system scanning feature is usually disabled and can be selectively enabled by, for example, system administrators so as to balance accuracy of software discovery with system performance.

SUMMARY OF THE INVENTION

Therefore, it is an object of the present invention to solve the above-noted and other problems of conventional configuration management systems, as well as license compliance systems, and to provide an apparatus and a method which can provide for configuration management and/or license compliance in a network environment.

Accordingly, there is disclosed a method for determining a software configuration in a computer system having a plurality of devices which can communicate with a central server and a one or more shared file systems, the method including the acts of determining, by each of the devices, which of the one or more shared file systems the corresponding device is mounted to; retrieving, by each of the devices, one or more of hostname, mount point and directory information corresponding with the one or more shared file systems that the corresponding device is mounted to; associating, by the central server, each of the one or more shared file systems with each of the devices that is mounted thereto based upon one or more of the hostname, mount point and exported directory information; designating for each of the one or more shared file systems a device which is mounted thereto to perform a scanning operation on the corresponding shared file system, the device being selected from the plurality of devices; transmitting, to each designated device, information related to the one or more shared file systems that the corresponding designated device has been designated to scan, the information related to the one or more shared file systems comprising hostname information, directory information, and catalog information, the catalog information comprising signature matching information and platform information; scanning, by each designated device, the one or more shared file systems that the corresponding device has been designated to scan so as to identify software products on the corresponding shared file systems that correspond with the catalog information; receiving, from each designated device, results of the scanning, the results of the scanning comprising the an identification of the designated device which performed the scan, identified software products, and hostname, mount point, and exported directory information corresponding with the designated device that performed the scan; downloading, by the central server, to requesting devices that are selected from the plurality of devices other than the designated devices, the results of the scan; processing, by the requesting devices, information related to the results of the scan; merging, by the requesting devices, the results of the processing with a list of software products that are determined to be present on a local volume of the corresponding requesting device so as to obtain information related to a software inventory; uploading, to the central server, the information related to the software inventory; and determining, by the central server, a software configuration using the information related to the software inventory and the results of the scanning.

According to one aspect of the invention the designating step may be performed by the central server.

BRIEF DESCRIPTION OF THE DRAWINGS

Embodiments of the present invention will now be described, by way of example, with reference to the accompanying drawings, wherein.

DETAILED DESCRIPTION OF THE INVENTION

Figure 1:
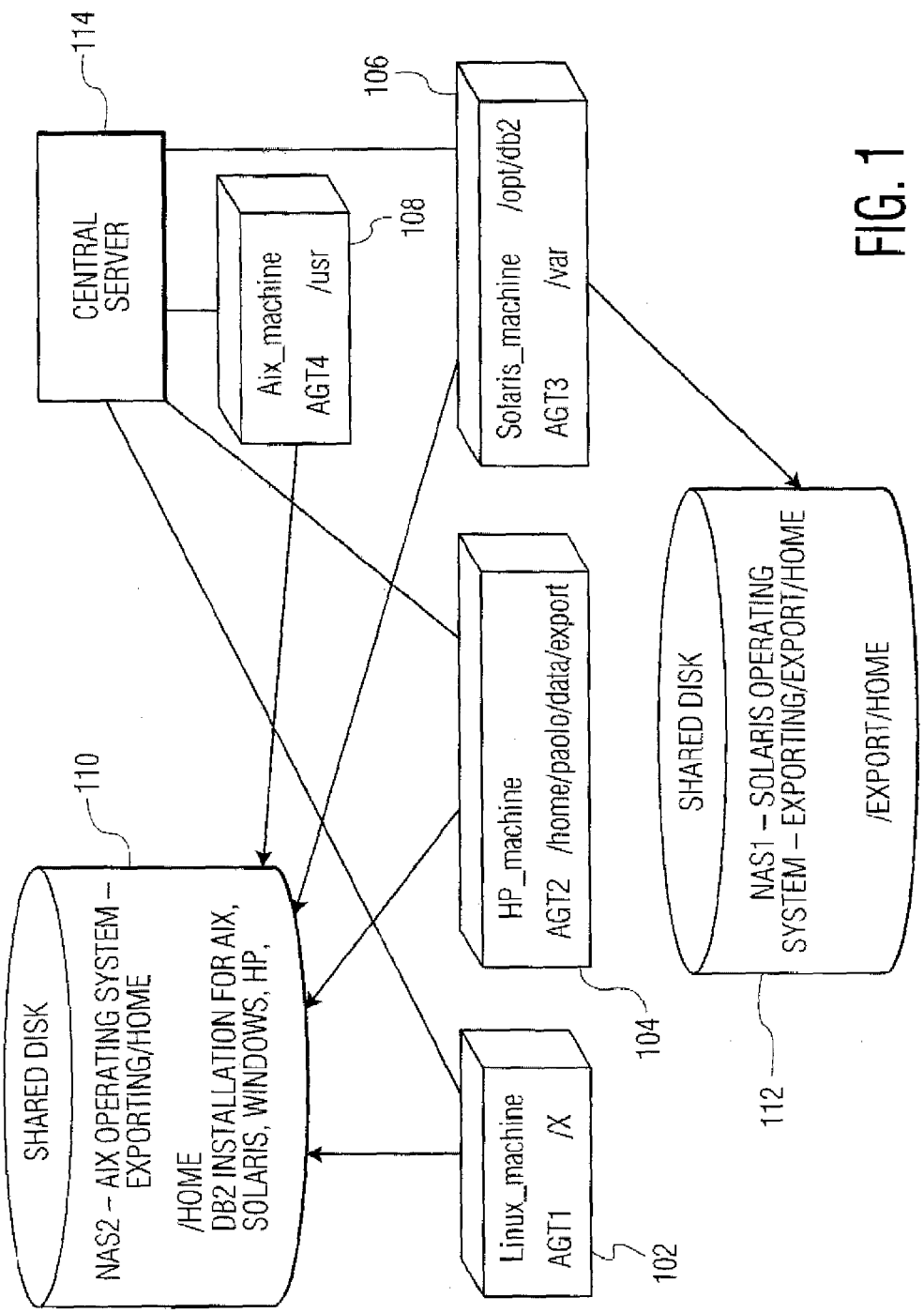
FIG. 1 is a block diagram which illustrates a shared file system according to the present invention.

In the drawings, the same reference numerals have been used to indicate corresponding features.

Preferred embodiments of the present invention will now be described in detail with reference to the drawings. For the sake of clarity, certain features of the invention will not be discussed when they would be apparent to those with skill in the art.

According to the present invention, a system and a method to efficiently scan and/or perform a complete software inventory (hereinafter inventory) of a shared file system including a plurality of file servers (hereinafter machines) disclosed. An advantage of the present invention is that a scanning process to determine an inventory of a shared file system may be satisfactorily performed using one scan (however two or more scans is also envisioned) that is performed by a selected agent on a machine mounting the shared file system and the results of the scan can be shared between all other agents on machines mounting the same shared file system. Accordingly, unnecessary scanning by all the agents running on machines that share (i.e., can see the shared file system) the same shared file system can be avoided.

A block diagram which illustrates a shared file system according to the present invention is shown in FIG. 1. The system 100 includes one or more agents (ATGx-AGT1-AGT4, respectively) each corresponding with machines 102-108, one or more file-sharing servers (servers) such as, for example, 110 and 112 (hereinafter NAS1 and NAS2, respectively) forming a mounted file system, and one or more central servers 114. Each of the agents (AGTx) operates on a corresponding machine (102-108) and can interface with corresponding software on the one or more central servers 112.

In order to efficiently scan remote file systems, each shared file system (NAS1 and NAS2) is scanned by a selected agent (AGTx) of the agents (e.g., AGT1-AGT4). However, agents (AGTx) may also reside in other system devices such as, for example, central server, etc.). Then, the results of the scan are distributed (via, for example, the central server 114) to other agents (AGT1-AGT4) mounting the same shared file system (e.g., NAS1 and NAS2). Each agent (e.g., AGT1-AGT4) can discovery mounted file systems (e.g., NAS1 and NAS2) and upload its findings to a central database such as, for example, the central server 114. Also each agent (e.g., AGT1-AGT4) may download from the central server 114 a list of mounted file systems (e.g., NAS1, NAS2) that it is assigned (i.e., selected) to scan. The results of the scan by the assigned agents (of the agents AGT1-AGT4) may then be reused by other agents (which were not assigned to perform the scan).

After determining which of the shared file systems (NAS1 and/or NAS2) that it is mounted to, each agent (e.g., AGT1-AGT4) generates a list of mounted file systems and uploads this list to the central server 114. Each of these lists includes information related to a canonical hostname (or Internet Protocol (IP) address) of the remote system, information related to a mount point, and, information related to an exported directory. Each agent then transmits this information to the central server 114. The central server 114 then uses the information from each of list of mounted file systems that it receives from each of the agents (AGT1-AGT4) and compiles its own list of mounted file systems (e.g., a shared file system list) which includes data from each of the agents (AGT1-AGT4). The shared file system list is better illustrated with reference to Table 1 below.

TABLE 1

| AGENT | ACTION | MOUNTED HOST | MOUNT POINT | EXPORTED DIRECTORY |
|---|---|---|---|---|
| AGT1 | UPLOAD | NAS2 | /x | /home/products/linux |
| AGT2 | UPLOAD | NAS2 | /home/paolo/data/export | /home/products |
| AGT3 | UPLOAD | NAS1 | /var | /export/home |
|  |  | NAS2 | /opt/db2 | /home/products/solaris/db2 |
| AGT4 | UPLOAD | NAS2 | /usr | /home |

The central server 114 may then optionally output information related to the shared file system list to a user (or to the system) or use this information itself, so that an agent (e.g., AGT1-AGT4) for scanning each of the shared file systems (e.g., NAS1 and NAS2) from a group of candidate agents can be selected (the selection process will be described in more detail below). This output information is better illustrated with reference to FIG. 1 and Table 2 below.

TABLE 2

| Sharing Host | Shared Disc | Agents | Mounted Directory |
|---|---|---|---|
| NAS2 | /home | AGT1 (linux) | /home/products/linux |
|  |  | AGT2 (HP) | /home/products |
|  |  | AGT3 (solaris) | /home/products/solaris/db2 |
|  |  | AGT4 (aix) | /home |
| NAS1 | /export/home | AGT3 (solaris) | /export/home |

The information in Table 2 (and/or other Tables) may also be output in, for example, text and/or graphic form for the convenience of a user.

After optionally outputting (e.g., to the user or the system as will be explained below) the shared file system information, the user (or the system as will be explained below) may select a single "discovery" agent for each entry (i.e., each remote file system). For example, a possible selection could be AGT3 for both NAS1 and NAS2 to have just one (discovery) agent scanning all the shared discs. However, this may not be the best selection as AGT3 sees only a subdirectory of /home. So assume, for the present example, that AGT3 is selected for NAS1 and AGT4 is selected for NAS2. With regard to AGT1 and AGT2, these agents are not selected to perform any scans. The user's (or the systems) selection of one or more discovery agents is then communicated to the central server 114.

After the one or more agents are selected to be the discovery agents (e.g., AGT3 and AGT4 in the present example), the discovery agents (e.g., AGT3 and AGT4) receive from the central server 114 a list of shared discs to scan. This list can include information such as, for example, the combination of the name of the mounted host, the mounted directory, and/or the corresponding designated discovery (i.e., scanning) agent (AGTx). This is more clearly illustrated with reference to Table 3 below.

TABLE 3

| DESIGNATED (DISCOVERY) AGENT | REMOTE FILE SYSTEM TO SCAN |
|---|---|
| AGT1 | NONE |
| AGT2 | NONE |
| AGT3 | NAS1/export/home |
| AGT4 | NAS2/home |

Thereafter, the agents, that are assigned to perform a scan (i.e., the discovery agents—AGT3 and AGT4), download one or more catalogs of product signatures from the central server 114. These catalogs can include information for all the supported platforms (e.g., Linux, AIX, HP, Solaris, etc.). Then, the discovery agents process all the catalogs and use them for executing a software inventory scan.

The catalogs include information related to knowledge base is in the form of a catalog which contains definitions of software (e.g. product names and/or versions) and the related signatures. The software catalog lists all the known products which can be found on the managed system. As used herein, term signature refers to information that can be used to determine if a software product is installed and/or running on the system of the present invention. For example, signature information can include information that is unique to a software product such as, for example, a file name, file size, operating code, etc., that may be used to identify a software product. Further information about signatures can be found in U.S. Patent Publication No. 2007/0150587 entitled "Method and Apparatus for Populating a Software Catalog with Automated Use Signature Generation," to D'Alo et al., the contents of which are incorporated herein by reference in its entirety.

For each corresponding discovery agent (e.g., AGT1-AGT4), it may be necessary to process the catalogs for all the platforms since the shared disc can host installations of the same product for different operating systems.

When all the catalogs have been downloaded and processed, the corresponding discovery agent (e.g., AGT3 and AGT4) runs the software inventory scan against the designated remote file system (e.g., see, Table 3). Accordingly, using the present example: AGT3 runs a scan, for each catalog platform, against the directory /opt/db2 and obtains one scan result for each platform; and AGT4 runs a scan, for each catalog platform, against the directory /usr and obtains one scan result for each platform. Accordingly, the shared discs (NAS1 and NAS2) will be scanned only one time; which will be by a designated (i.e., discovery) agent.

When all the scan results, for all of the catalogs, are available, the designated agent (e.g., AGT3 and AGT4 in the present example) uploads corresponding information to the central server 114. This information may include, for example, information related to the time of the scan (e.g., "<scan time>"), platform type (e.g., "aix"), the name (or other identifier) of the remote host (e.g., "NAS1"), the exported directory (e.g., "/export/home"), the mount point (e.g., "var"), the scan result itself (one for each platform), and/or remote inventory (INV) which refers to software discover activity performed by a corresponding agent on a remote file system. This information is more clearly illustrated with reference to Table 4 below.

TABLE 4

| AGENT | OPERATION | RESULTS | | |
|---|---|---|---|---|
| AGT3 | UPLOAD | <scan time> aix | <scan time> solaris | ... |
| | REMOTE INV | NAS1 /var /export/home <aix scan result> | NAS1 /var /export/home <solaris scan result> | |
| AGT4 | UPLOAD | <scan time> aix | ... | ... |
| | REMOTE INV | NAS2 /usr /home <aix scan result> | | |

After the remote server 110 receives from the designated agents (e.g., AGT3 and AGT4) the corresponding remote inventory information collected by each of the designated agents, agents (i.e., requesting agents) that see the same remote file system, can connect to the remote server 110 and download the remote inventory information from the remote server 110. The requesting agents (e.g., AGT1, AGT2, and/or AGT3) can perform this activity periodically so that they have updated information about the remote file system. Thus, the requesting agents can request, from the central server 114, whether any inventory for their own remote file systems is available. Accordingly, each requesting agent transmits information related to the names of the mounted hosts, the mounted directories, the last scans (if any) performed for these, to the central server 114 and receives from the central server 114 a corresponding scan result for the agent's platform, information related to the exported directory and the mount point for the agent that performed that inventory scan (i.e., the discovery agent that performed the scan). This is better illustrated with reference to Table 5 below.

TABLE 5

| AGENT | OPERATION | INPUT COMING FROM AGENT | OUTPUT RECEIVED FROM SERVER |
|---|---|---|---|
| AGT1 | Download | <scan time> NAS2 /home/products/linux | <scan result for linux> (coming from AGT4) /usr (mount point for AGT4 that performed the scan) /home |
| AGT2 | Download | <scan time> NAS2 /home/products | <scan result for hpux > (coming from AGT4) /usr (mount point for AGT4 that performed the scan) /home |
| AGT3 | Download Inventory Info | <scan time> NAS2 /home/products/solaris /db2 | <scan result for solaris> (coming from AGT4) /usr (mount point for AGT4 that performed the scan) /home |
| | | <scan time> NAS1 /export/home | <scan result for solaris> (coming from AGT3) /var (mount point for AGT3 that performed the scan) /export/home |

Because the agents can mount different directories from each other, it may be desirable to filter out information related to certain directories that a corresponding agent cannot see. For example, assuming that AGT1 can see only what is under the /home/products/linux directory, when AGT1 receives information related to a scan from AGT4, this information can include data for the /home directory i.e., the whole file system in NAS2. However, as AGT1 only sees a slice or subset of the /home directory, AGT1 filters out the information that does not belong to the slice of the file system that it can see. Thus, when AGT1 receives information from AGT4 about, for example, a file in /home/prod1.sys, which is outside of the /home/products/linux directory that AGT1 can see, AGT1 can discard this information.

Accordingly, when the requesting agent receives information corresponding to the shared disc inventory file location (i.e., an inventory file), the corresponding agent processes this information and changes the path of the discovery signatures. For example, during processing the corresponding (requesting) agent replaces the mount point of the agent (i.e., the corresponding discovery agent) that performed the scan with the mount point of the agent which receives the inventory file (i.e., its own mount point). For example, assuming that there are two recognition files on NAS2: /home/prod1.sys; and /home/products/linux/prod2.sys, AGT4 would (as a result of the scan) respectively find signatures of these two files in the paths: /usr/prod1.sys; and /usr/products/linux/prod2.sys. Then, as a result of its request, AGT1 would receive corresponding information (e.g., via the central server 114) which can include information related to the mount point for AGT4 (e.g., /usr) and the exported directory (e.g., /home). AGT1 would then replace the mount point (i.e., /usr) with /home obtaining paths /home/prod1.sys, and /home/products/linux/prod2.sys. Further, as AGT1 mounts the path /home/products/linux the path /home/prod1.sys is discarded, while prod2.sys is correctly processed becoming /X/prod2.sys. This information of products discovered on the shared volume is then merged with local information as will be described below. Although not shown, it is envisioned that the requesting agents may be selected to include all agents or a subset of agents (e.g., only agents which were not designated to perform the scan on the remote file system or selected according to another criteria), as desired.

Each requesting agent that performs the processing (e.g., AGT1, AGT2, and AGT3 in the present example), then merges the information of products discovered on the shared volume (based upon the processed scan result received from the central server 114 that was generated by a corresponding discovery agent) with the list of software products that the requesting agent (i.e., AGT1) discovers on its local volume (that the corresponding machine can scan periodically at, for example, set intervals), and uploads the merged information to the central server 114 as the requesting agent's final inventory.

Figure 2:
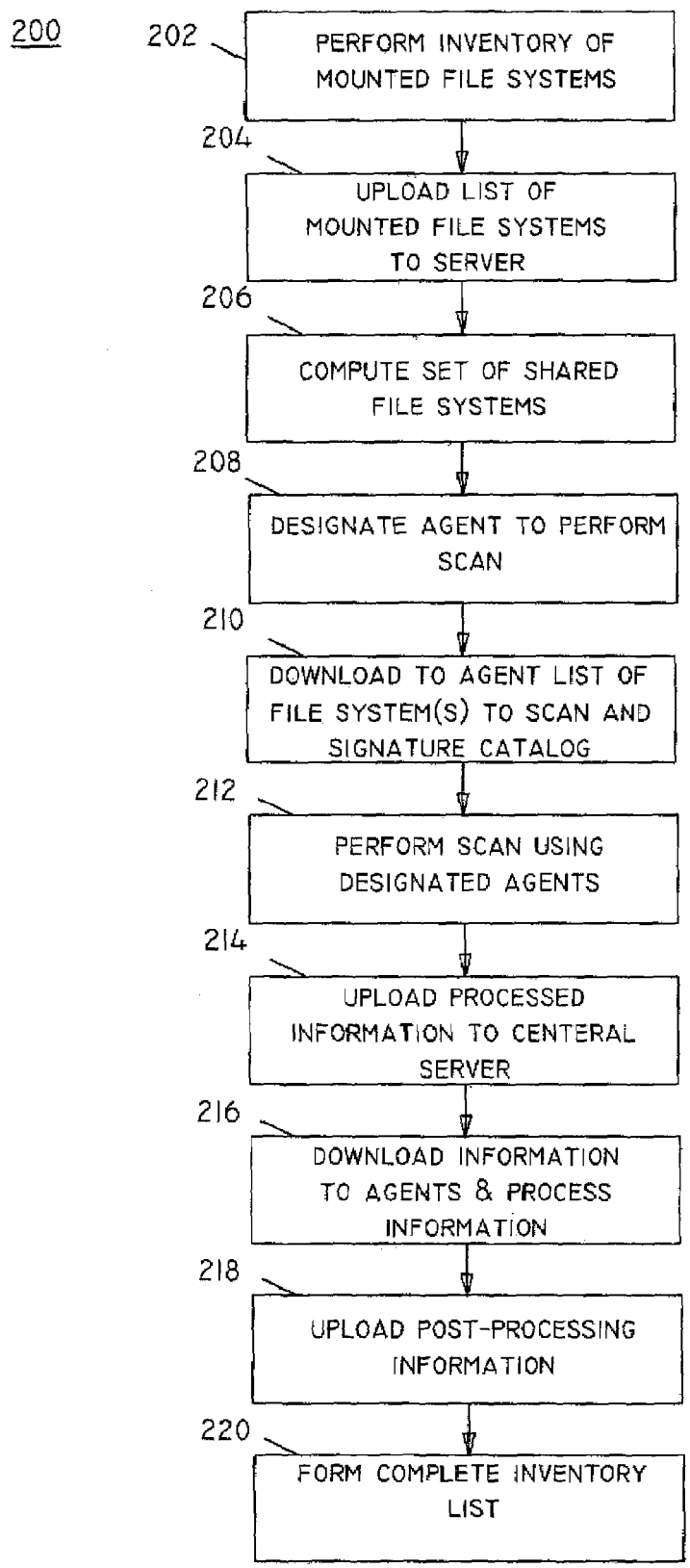
FIG. 2 is a flow chart illustrating a scanning process according to the present invention.

A flow chart illustrating a process according to the present invention is shown in FIG. 2. Process 200 may be performed using one more computers communicating over a network such as, for example, a LAN (local-area network), a WAN (wide-area network), the Internet, etc. (not shown). The process 200 can include one of more of the following steps. Further, one or more of these steps may be combined and/or separated into sub-steps, if desired.

With reference to FIG. 2, in step 202, the process performs an inventory of the mounted file systems for each machine 102-108 (corresponding with m1-m4, respectively) which has a corresponding agent (i.e., AGT1-AGT4, respectively). For example, for each mounted file system, the process retrieves information related to the host sharing it (i.e., a sharing server such as, for example, NAS1 and/or NAS2) and the share path and forms a list including this information. For example, with reference to Table 1 above, for AGT1, the corresponding information can include one or more of: NAS2 (server sharing the file system), /home/products/linux (the shared disc), and /x (the mount point). The information for each of the machines (e.g., m1-m4) may be compiled by an agent (AGTx) of the respective machine in a suitable format (e.g., see, Table 1). After completing step 202, the process continues to step 204.

In step 204, according to the process, each agent (e.g., AGT1-AGT4) uploads the list compiled in step 202 to a central server (e.g., 114). The process then continues to step 206.

In step 206, the process computes (e.g., at the central server 114) information related to a set of shared file systems and groups the shared file systems according to, for example, sharing host and shared path (e.g., see Table 2). The file systems can be optionally grouped based on a prefix of the shared path. Each file system has associated with it the list of machines mounting it. These machines will be grouped as candidate machines or agents. Suppose for example that three machines (e.g., m1.myorg.com, m2.myorg.com, and m3.myorg.com) respectively mount the following file systems, exported from fileserver.myorg.com: home/user1, /home/user2, and /home. These shared file systems can be grouped in a single exported file system (/home exported by the fileserver.myorg.com) with the associated three machines (i.e., m1, m2, and m3), where the first two machines (i.e., m1 and m2) have a sub-mount point of user1 and user2, respectively. After completing step 206, the process continues to step 208.

In step 208, the process designates one or more agents (i.e., discovery machines mx) to perform the scan from the group of candidate machines (e.g., m1-m4 each corresponding with a candidate agent AGT1-AGT4, respectively) to scan each of the shared file systems. This process can be performed by the system and/or the user. For example, the following methods may be used to designate a discovery agent.

a. Output (e.g., by the central server 114) to the user the list of candidate agents (e.g., AGT1-AGT4) whose corresponding machines mount the shared file system and await a selection by the user of a designated agent from the candidate agents (e.g., AGT1-AGT4) to perform the scan.

b. Automatically select/determine a best candidate agent (e.g., by the central server or other system device) to perform the scan. For example, the system may determine which devices (e.g., m1-m4) are closest (e.g., in physical proximity) to a server (e.g., NAS1) and select a discovery agent based upon this determination. In other words, a discovery agent may be selected because of its physical location relative to the sharing server (for example in the same subnet) to reduce network bandwidth consumption. If the sharing server is part of multiple subnets, the automatic logic may also evaluate which is the fastest subnet and thus select a candidate agent on that subnet. The system may also use other criteria (e.g., statistical analysis, heuristic analysis, etc.) to aid in the selection process.

c. Automatically select/determine the best candidate agent (e.g., by the central server or other system device) to perform the scan by, for example, selecting the machine exporting the file system (if such machine has a discovery agent installed).

d. Automatically determine a best candidate agent and output the determination to a user who can override the determination and/or select another agent. For example, a list of best to worst candidate agents can be determined as AGT1, AGT3, AGT4, and AGT2—from best to worst, using a predetermined criteria. Then this information can be output to the user who can select an agent (e.g., AGT3) or absent a user's selection (e.g., in 30 seconds), the system can select an agent from the candidate agents and continue the process. As an optional method, the user can be given an opportunity to select to scan a directory such as, for example, scanning only /home/user1 and /home/user2 instead of scanning /home because /home contains only data, and all the installed software is in the two subdirectories. This can save additional network bandwidth and processing time, while requiring some manual intervention. However, once selected by a user or programmed, the system can remember this setting and use it during a future scanning process.

After one or more agent is/are designated as a discovery agent in step 208, the process continues to step 210.

In step 210, the process (periodically) downloads (e.g., from the central server 114) to the one or more discovery agents information related to the list of file systems they have be designated to scan and complete signature catalog (hereinafter catalog) information to use for signature matching.

In step 212, the one or more discovery agents scan the file systems that they were designated to scan. When performing a scanning process, each of the one or more discovery agents scans only the mounted file systems it is designated to scan. The scan is performed using the downloaded catalog information as a reference to find matching signatures of software products installed on the system. The result of the scan forms a set of matched file signatures which corresponds with discovered installed software products. Each signature has a path which is dependent on the local mount point. For example, if the same file system is mounted under /home/user1 and /home/user2 on two different machines (e.g., first and second servers, respectively), the same matched signature will have path /home/user1/something or /home/user2/something if the scan is performed on the first and second servers, respectively.

Further, if the (downloaded) catalog information is divided by platform (e.g., using multiple catalogs, each one containing the signatures for a specific operating system e.g., AIX, Linux, Solaris, HP, etc.), the corresponding discovery agent downloads catalog information for all the operating systems and performs one scan for each downloaded catalog. The results of the scan are multiple sets of discovered (i.e., matched) file signatures corresponding with (multiple sets of installed products), each set containing only entries valid/executable on a particular operating system. After completing step 212, the process continues to step 214.

In step 214, the one or more discovery agents each upload (e.g., to the central server 114) the result of their scan (i.e., the single or multiple sets of installed products which were previously determined in step 212) with the corresponding identification of the mounted file system, the mount point and/or the operating system (e.g., Linux, AIX, HP, Solaris, etc.) that the scan refers to. Thereafter, the process continues to step 216.

In step 216, post-processing is performed by one or more requesting agents (e.g., see, AGT1-AGT3 in Table 1). Each of these requesting agents performs a scan of its local file systems and downloads from the server the matched signatures for the mounted file systems, with the mount point and the export point on the scanning machine. The requesting agents post-process the matched signatures to adapt them to their local mount point and the export point of the corresponding agent (which will be described in detail below). After this post processing, signatures are merged with the ones matched on the local file system, and the resulting, merged set of signatures is processed against the software catalog to discover installed software products (or components). The requesting agents can be selected to include all agents or a subset of agents, as desired. For example, if the requesting agents are selected from a subset of agents, then the requesting agents can include, for example, agents other than the discovery agents or agents that were not designated to perform the scan of, for example, a particular mounted machine, directory, and/or path of a remote file system, as desired. For example, in the present example, although AGT3 was designated as a discovery agent, it is also a requesting agent and receives scan information from, for example, itself and AGT4, as shown in Table 5.

The post processing step is necessary to manage the following scenario: suppose that the scan was executed on machine m3, mounting /home under /opt; two signatures are matched /opt/user2/sig1.sys2 and /opt/user1/sig2.sys2. The receiving agent knows both the mount point (/opt) and the export path (/home) of the scanning agent, and thus is able to modify the signatures to compute their path on the exporting machine using the following rule: replace the mount point with the export path, thus obtaining /home/user2/sig1.sys2, /home/user1/sig2.sys. The post processing agent then adapts these signatures to its local path by replacing its export path (/home/user1) with its local mount point (/usr): the first signature is thus discarded while the second one is modified to /usr/sig2.sys.

Further, if the catalog was divided by platform (as described above in step 210) and the scan at step 210 produces multiple sets of matched signatures, one per platform, the agent downloads only the set of matched signatures for its corresponding platform.

In step 218, the inventory computed in step 216, by the requesting agent's machines, that includes both signatures discovered on local and mounted file systems, is uploaded to the central server 114 as the complete inventory of the respective machine (e.g., m1-m4). The process then continues to step 220.

In step 220, the central server 114 processes information received from the requesting and discovery machines and forms a complete list of installed software products. This information may be output to the user (e.g., via a display, etc.), used by the system, etc., as desired.

Although not shown in the flowchart of FIG. 2, in an optional step, the user can tag discovered software as not executable on a particular machine. Although the system according to the present invention may, for example, discovery file signatures on the shared file systems, a missing registry key (or keys) can prevent software execution on the system even if binary files are accessible through a shared file system. Accordingly, it may not be desirable to include this software (which cannot be executed on the system) in a list of installed software products. This can simplify record processing.

Further, as an in addition to or as alternative to the above-stated optional step, the system may use usage data to determine whether a software product should be included in the installed software product list. For example, a product installed on a shared disc can be considered as installed and usable only if it has run at least once, or at least once within a certain period of time (e.g., once in the last 10 days) on the system. Thus, the system can make this determination and simplify record keeping and can avoid manual intervention or post processing of the complete list of software products which would otherwise be necessary to determine whether detected software should be listed as installed software.

Accordingly, the present invention discloses a method for scanning a shared file system, and sharing the result between one or more the machines mounting the shared file system. Accordingly, the method of the present invention discloses methods to:

1. Identify machines mounting the same, shared file system. This can be beneficial when it is preferred that a single file system be scanned once and the results shared among a plurality of machines mounting the same shared file system.
2. Manage different mount points on the different mounting machines. For example the same file system can be mounted on /home on one machine and be mounted on /opt on another mounting machine, and
3. Manage different mounted slices of the same exported file system. For example, if a machine exports (e.g., has an exported directory) of /home, three (for example) other systems can mount /home/user1, /home/user2, and /home directories, respectively.

Certain additional advantages and features of this invention may be apparent to those skilled in the art upon studying the disclosure, or may be experienced by persons employing the novel system and method of the present invention, chief of which is that accuracy of software discovery is balanced with system and network performance.

Accordingly, an accurate picture of installed software on a shared file system is obtained while system and network resources are conserved. Accordingly, as system and network resources are available to perform "real work," an increase efficiency and productivity of the system and network can be realized.

A further advantage of the present invention is that it provides a system and method to obtain a software inventory of shared file systems while using a minimum of network bandwidth and system resources. Accordingly, user inconvenience caused by limited network bandwidth and system resources can be minimized or entirely avoided.

Further, by conserving system and network resources, system and network updates can be delayed, thus reducing operational costs during a given time frame.

Finally, the above-discussion is intended to be merely illustrative of the present system and should not be construed as limiting the appended claims to any particular embodiment or group of embodiments. Thus, while the present system has been described with reference to exemplary embodiments, it should also be appreciated that numerous modifications and alternative embodiments may be devised by those having ordinary skill in the art without departing from the broader and intended spirit and scope of the present system as set forth in the claims that follow. In addition, the section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or "an" preceding an element does not exclude the presence of a plurality, of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for determining a software configuration a computer system having a plurality of devices which can communicate with a central server and a one or more shared file systems, the method comprising the steps of:

determining, by each of the devices, which of the one or more shared file systems the corresponding device is mounted to;

retrieving, by each of the devices, one or more of hostname, mount point, and directory information corresponding with the one or more shared file systems that the corresponding device is mounted to;

associating, by the central server, each of the one or more shared file systems with each of the devices that is mounted thereto based upon one or more of the hostname, mount point, and exported directory information;

designating, by the central server, for each of the one or more shared file systems a device which is mounted thereto to perform a scanning operation on the corresponding shared file system, the device being selected from the plurality of devices;

transmitting, to each designated device, information related to the one or more shared file systems that the corresponding designated device has been designated to scan, the information related to the one or more shared file systems comprising hostname information, directory information, and catalog information, the catalog information comprising signature matching information and platform information;

scanning, by each designated device, the one or more shared file systems that the corresponding device has been designated to scan so as to identify software products on the corresponding shared file systems that correspond with the catalog information;

receiving, from each designated device, results of the scanning, the results of the scanning comprising an identification of the designated device which performed the scan, identified software products, and hostname, mount point, and exported directory information corresponding with the designated device that performed the scan;

downloading, by the central server, to requesting devices that are selected from the plurality of devices other than the designated devices, the results of the scan;

processing, by the requesting devices, information related to the results of the scan;

merging, by the requesting devices, the results of the processing with a list of software products that are determined to be present on a local volume of the corresponding requesting device so as to obtain information related to a software inventory;

uploading, to the central server, the information related to the software inventory; and determining, by the central server, a software configuration using the information related to the software inventory and the results of the scanning.

* * * * *